May 16, 1933.                C. J. CARLSON                1,909,609
                        ANTISKID DEVICE FOR VEHICLES
                        Filed April 12, 1930        3 Sheets-Sheet 3
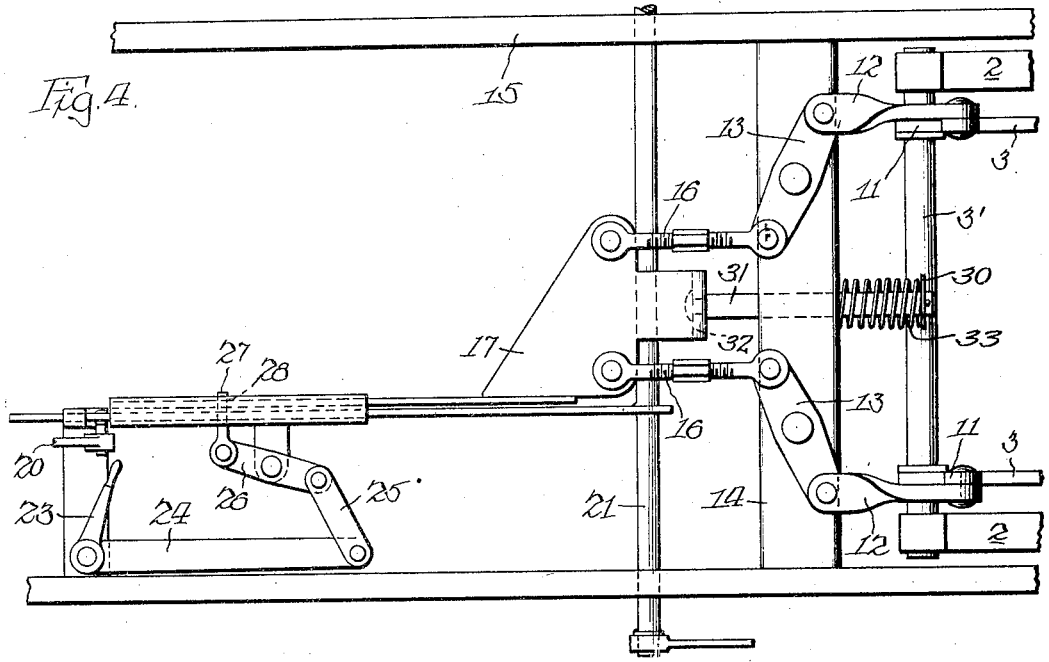
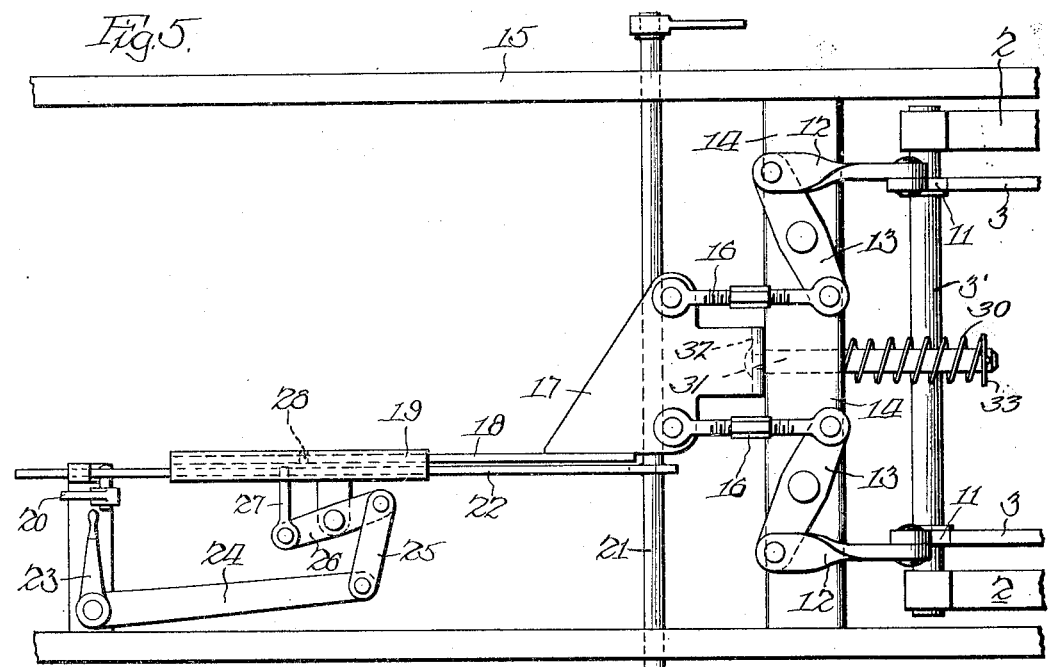
Inventor:
Carl J. Carlson Patented May 16, 1933

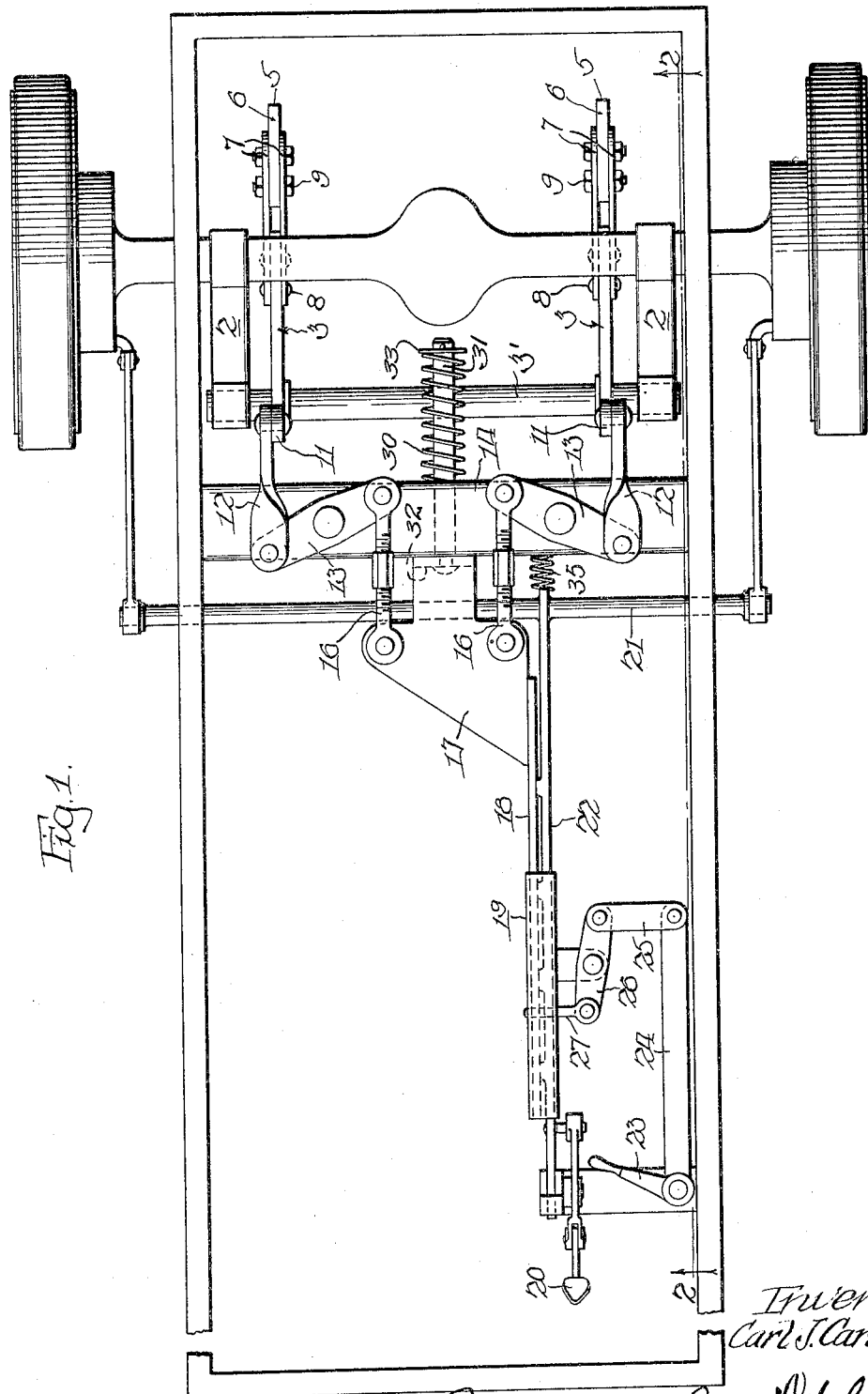

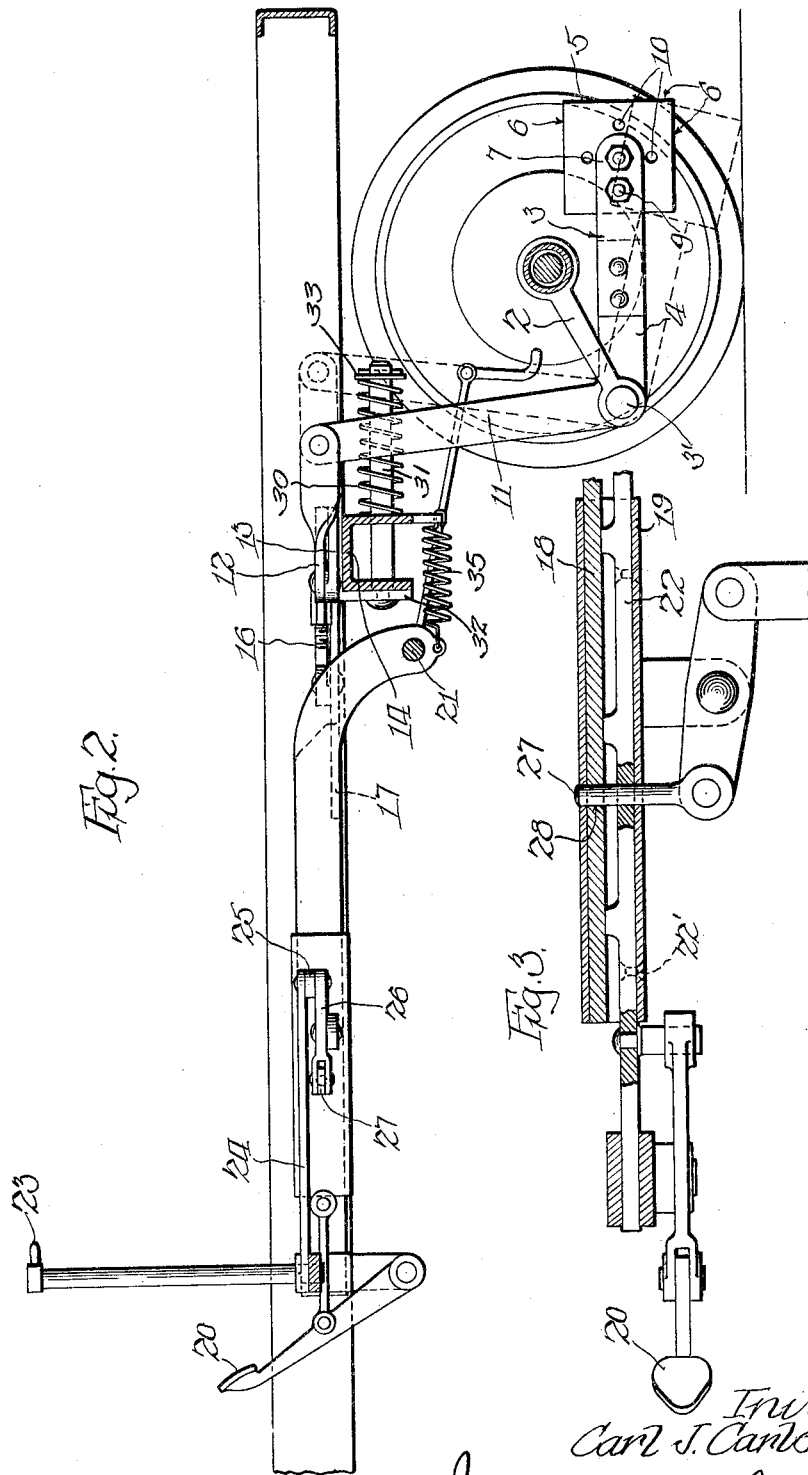

1,909,609

UNITED STATES PATENT OFFICE

CARL J. CARLSON, OF CHICAGO, ILLINOIS

ANTISKID DEVICE FOR VEHICLES

Application filed April 12, 1930. Serial No. 443,636.

My invention relates to vehicles, and more particularly to an anti-skid mechanism for vehicles.

The present invention is directed to a type of anti-skid device which is normally held out of contact with the road, but which may be moved into operative position, at will, to prevent the vehicle from skidding, either sidewise or in the direction of travel.

It is an object of the invention, among others, selectively to connect the anti-skid device to the brake mechanism so that depressing the brake pedal may operate the anti-skid device. The arrangement may, of course, include operating the brake mechanism simultaneously, but it will be observed that the invention in its broader aspects relates to an anti-skid device having one or more road engaging edges which may be brought into position to engage the road on opposite sides of the longitudinal center of the vehicle. A balanced holding engagement with the road may accordingly be obtained, and this is particularly true where the anti-skid devices are located adjacent to the rear wheels of the vehicle, although this arrangement may be varied considerably.

The construction herein disclosed is exceedingly simple, inexpensive and easy to apply. When in a position of non-use, the anti-skid devices will not interfere with the normal use of the vehicle, but they may be readily swung into position of use effectively to check forward or sidewise skidding.

Other objects and advantages of the invention will be apparent from the following detailed description when taken in connection with the accompanying drawings which form a part hereof.

In the drawings,

Figure 1 is a top plan view of a chassis of a vehicle illustrating the invention embodied therein;

Fig. 2 is a vertical sectional view taken on line 2—2 of Figure 1;

Fig. 3 is a horizontal sectional view of the structure employed for selectively connecting the anti-skid mechanism to the brake mechanism for operation by the brake pedal;

Fig. 4 is a view similar to Fig. 5 illustrating the position of the parts when the anti-skid mechanism is connected to the brake mechanism and the brake pedal is depressed; and Fig. 5 is a similar view illustrating the position of the parts with the anti-skid mechanism disconnected and the brake pedal depressed.

The present invention may be employed on any type of vehicle, and it is not essential that the vehicle be furnished with brake mechanism. I find, however, that certain advantages are obtained by associating the invention with the brake mechanism in that both the brake mechanism and the anti-skid mechanism may be actuated at the same time by means of the brake pedal.

In the drawings, I have shown suitable supporting means in the form of brackets 2 carried by the rear end of the vehicle, say by the differential housing or otherwise, and to which brackets movable angle arms 3 are mounted, say by a cross rod 3'. These angle arms 3 are preferably supported so that the horizontal leg 4 thereof may be swung downwardly, as illustrated in dotted lines in Fig. 2. Suitable anti-skid plates 5 may be carried on the extremities of horizontal legs 4. Plates 5 may be of any suitable shape or design, but, as illustrated in the drawings, they are preferably of a type having a plurality of road engaging sides or edges 6, each plate having at least one edge arranged for contact with the road, whereby to bite into the road, or ice thereon, to prevent sidewise skidding and to check forward skidding of the vehicle.

The arrangement at the extremities of arms 4 may be such that these anti-skid plates 5 may be quickly renewed. It is contemplated, however, that these plates will not require renewing until each edge 6 has been worn away through use, the mounting of each plate being purposely provided to permit such interchangeability in position so that such edge 6 may in turn be arranged for engagement with the road. This is accomplished by employing side members 7, which extend parallel to the horizontal legs 4 of arms 3, and which are secured to these legs at one end by welding or riveting, as indicated at 8 in Figure 2. The opposite or free end of these plates 7 is adapted to receive bolts 9 passing through suitable openings 10 so furnished in plates 5 as to permit positioning of the plate to bring any one of its four edges 6 into contact with the road when actuated.

The vertical legs 11 of arms 3 may be attached to links 12, which are in turn connected to intermediate levers 13 suitably carried, in pivotal relation, by a cross member 14 on the chassis frame 15. The opposite ends of intermediate levers 13 may be connected to adjustable interconnecting elements 16, which may include turnbuckles for securing adjustability. These interconnecting adjustable elements 16 are then connected to a plate 17, which may be moved in a horizontal plane by a motion transmitting element 18, shown in the drawings as a bar extending forwardly and embraced within a sleeve 19. This sleeve 19 also receives the connection 22 which transmits motion from the brake pedal 20 to the brake equalizer bar 21. As a matter of fact, a simple construction is to arrange sleeve 19 in fixed relation to this brake connector, so that they may both move in unison. Plates 5 may be normally held out of contact with the road by means of a spring 30 encircling a bolt 31. Bolt 31 is arranged to be loosely carried by member 14 with one end thereof passing through a down-turned ear 32 on plate 17 and the opposite end having a disc 33 thereon. Spring 30 is disposed on bolt 31 between disc 33 and member 14 so that the action of the spring upon the disc will cause the bolt to draw the plate 17 to the right as shown in Fig. 1. A spring 35 connecting at one end to rigid member 14 and at the other end to connection 32 may be used normally to hold the brake mechanism in released position.

Means may be provided for selectively connecting members 18 and 22, so that the anti-skid devices will be actuated upon operation of the brake pedal 20. This may be accomplished by a hand-operated element 23 suitably mounted say within the driver's compartment, in a manner which will impart sufficient movement to links 24, 25 and 26 so as to project a pin 27 into an opening 28 furnished in member 18.

It will be observed in Fig. 5 that the link arrangement comprising the members 24, 25 and 26 may be such as to not require complete withdrawal of pin 27 from engagement with brake member 22, when the anti-skid mechanism is disconnected from the brake mechanism.

As illustrated in Fig. 3, the sleeve 19 is fixed to the brake member 22 by rivets 22' so that they will move in unison.

The anti-skid motion-transmitting member 18 is arranged to have relative movement with respect to member 22 when the pin 27 is withdrawn to a position shown in Fig. 5. As thus shown in this figure, operation of the brake mechanism will not operate the anti-skid device when the pin 27 is withdrawn. Assume, for instance, that it is desirable to swing the anti-skid devices into contact with the road to prevent skidding. The driver of the car moves the hand-operated member 23 from the position shown in Fig. 5 to the position shown in Fig. 4 so as to project pin 27 through aperture 28 in member 18. Both the brake mechanism and the anti-skid devices will then be actuated by operation of brake pedal 20.

I believe that the feature of selectively connecting the anti-skid mechanism or the anti-skid devices to the brake mechanism, whereby the former may be operated by the latter, is new and novel. It will be understood, however, that the structure herein shown may be changed or modified as desired without departing from the spirit or scope of the invention.

The manner of mounting the anti-skid plates 5 permits quick renewal at very little expense. Another advantage of this type of mounting allows the four edges of the plate to be used before renewal is necessary. The arms 3 may be suitably suspended under the differential housing of the vehicle, or other rear structure, so that the legs 4 of these arms 3 may be normally carried horizontally, thereby allowing sufficient road clearance for the vehicle.

Without further elaboration, the foregoing will so fully explain the gist of my invention, that others may by applying current knowledge, readily adopt the same for use under varying conditions of service, without eliminating certain features, which may properly be said to constitute the essential items of novelty involved, which items are intended to be defined and secured to me by the following claims.

I claim:

1. In a vehicle having the usual chassis and wheels therefor, the combination of a plurality of arms arranged for swinging movement, anti-skid plates having a plurality of road engaging edges, means for removably mounting said plates on said arms whereby at least one of said edges may be brought into contact with the road upon actuation of said arms, and means for actuating said arms.

2. In a vehicle having the usual chassis, wheels therefor, and brake mechanism for said wheels, the combination of an arm having a multi-edge plate thereon and movable in a direction to bring at least one edge of said plate into contact with the road, and lever means for selectively connecting said arm with said brake mechanism whereby said arm may be actuated upon actuation of said brake mechanism.

In witness whereof, I have hereunto subscribed my name.

CARL J. CARLSON.